(12) United States Patent
Robb et al.

(10) Patent No.: US 10,514,210 B2
(45) Date of Patent: Dec. 24, 2019

(54) FIN-TUBE HEAT EXCHANGER

(71) Applicant: Ingersoll-Rand Company, Davidson, NC (US)

(72) Inventors: James Lawrence Robb, China Grove, NC (US); George C. Hansen, Onalaska, WI (US); Tulsi Patel, Cary, NC (US)

(73) Assignee: Ingersoll-Rand Company, Davidson, NC (US)

( * ) Notice: Subject to any disclaimer, the term of this patent is extended or adjusted under 35 U.S.C. 154(b) by 321 days.

(21) Appl. No.: 14/973,955

(22) Filed: Dec. 18, 2015

(65) Prior Publication Data
US 2016/0187072 A1 Jun. 30, 2016

Related U.S. Application Data

(60) Provisional application No. 62/099,116, filed on Dec. 31, 2014.

(51) Int. Cl.
| | | |
|---|---|---|
| *F28F 1/40* | (2006.01) | |
| *B23P 15/26* | (2006.01) | |
| *F28F 19/06* | (2006.01) | |
| *F28F 21/08* | (2006.01) | |
| *F28D 7/16* | (2006.01) | |
| *F28D 7/10* | (2006.01) | |

(52) U.S. Cl.
CPC ............. *F28F 1/40* (2013.01); *B23P 15/26* (2013.01); *F28D 7/1669* (2013.01); *F28F 19/06* (2013.01); *F28F 21/084* (2013.01); *F28F 21/085* (2013.01); *F28D 7/10* (2013.01); *F28D 7/106* (2013.01)

(58) Field of Classification Search
CPC .. F28F 1/40; F28D 7/1669; F28D 7/10; F28D 7/106
USPC .......................................................... 165/154
See application file for complete search history.

(56) References Cited

U.S. PATENT DOCUMENTS

| | | |
|---|---|---|
| 1,821,080 A | 10/1930 | Sprong |
| 2,611,585 A | 9/1952 | Boling |
| 2,643,863 A | 6/1953 | Buschow |
| 2,703,921 A | 3/1955 | Brown, Jr. |
| 2,930,405 A | 3/1960 | Welsh |
| 3,158,122 A | 11/1964 | DeGive |
| 3,197,975 A | 8/1965 | Boling |
| 3,267,563 A | 8/1966 | Seaton |
| 3,287,923 A | 11/1966 | Elfving |
| 4,023,557 A | 5/1977 | Thorne et al. |
| 4,284,133 A * | 8/1981 | Gianni .................... F28D 7/106 165/133 |
| 4,351,389 A | 9/1982 | Guarnaschelli |

(Continued)

FOREIGN PATENT DOCUMENTS

WO    2013070450    5/2013

*Primary Examiner* — Joel M Attey
(74) *Attorney, Agent, or Firm* — Taft Stettinius & Hollister LLP

(57) ABSTRACT

An exemplary fin-tube construction includes an outer tube, an inner tube disposed within the outer tube, and a plurality of fins extending from an outer surface of the inner tube to an inner surface of the outer tube. The outer tube includes an inner portion and an outer portion. The inner portion, the inner tube, and the fins are formed at least primarily of a first material. The outer portion is formed at least primarily of a second material.

13 Claims, 3 Drawing Sheets

(56) References Cited

U.S. PATENT DOCUMENTS

| | | | |
|---|---|---|---|
| 4,730,669 A * | 3/1988 | Beasley | F28F 9/182 |
| | | | 165/151 |
| 4,873,127 A | 10/1989 | Onodera et al. | |
| 5,857,515 A | 1/1999 | Skupien | |
| 6,586,110 B1 | 7/2003 | Obeshaw | |
| 6,705,391 B1 | 3/2004 | Lewin | |
| 6,896,041 B2 | 5/2005 | Lomax, Jr. et al. | |
| 7,490,658 B2 | 2/2009 | Sasaki et al. | |
| 2005/0230089 A1* | 10/2005 | Ozaki | F28F 9/001 |
| | | | 165/149 |
| 2006/0042466 A1* | 3/2006 | Gaertner | F02M 25/12 |
| | | | 96/4 |
| 2006/0096750 A1* | 5/2006 | Meuzelaar | F28F 13/003 |
| | | | 165/181 |
| 2010/0139899 A1* | 6/2010 | Suzuki | F28F 21/084 |
| | | | 165/151 |
| 2011/0290364 A1 | 12/2011 | Biris et al. | |
| 2012/0036853 A1* | 2/2012 | Kidd | F02C 1/04 |
| | | | 60/659 |
| 2012/0168113 A1 | 7/2012 | Karamanos | |
| 2013/0062041 A1 | 3/2013 | Sakae et al. | |
| 2014/0000850 A1* | 1/2014 | Korn | F28F 1/00 |
| | | | 165/104.19 |
| 2014/0318119 A1* | 10/2014 | Svihla | F02B 29/0412 |
| | | | 60/599 |

\* cited by examiner

FIN-TUBE HEAT EXCHANGER

CROSS REFERENCE TO RELATED APPLICATIONS

This application claims the benefit of U.S. Provisional Application No. 62/099,116, filed Dec. 31, 2014, which is incorporated herein by reference in its entirety.

TECHNICAL FIELD

The present invention generally relates to heat exchangers, and more particularly, but not exclusively, to air-in-tube heat exchangers.

BACKGROUND

Multistage air compressors commonly utilize intercoolers between compression stages, in order to cool the compressed air prior to the subsequent compression stage. Many such air compressors utilize a heat exchanger construction whereby the air to be cooled flows over a finned array of tubes having a coolant flowing therethrough. Because the coolant is often water, these constructions are occasionally referred to as water-in-tube (WIT) heat exchangers. Other compressors utilize heat exchangers in which the air flows through tubes having a finned inner surface, and the coolant flows around the tubes. These constructions are referred to as air-in-tube (AIT) heat exchangers. The AIT construction is inherently more compact than the WIT construction, resulting in smaller heat exchanger volume.

A common choice of materials for heat exchangers is aluminum, due in part to its relatively low cost when compared to other materials such as copper. In systems which utilize water as the coolant, however, copper is commonly utilized, due to aluminum's susceptibility to galvanic corrosion. Many conventional WIT heat exchangers flow the water through copper pipes, and thermally couple aluminum fins to the outside of the copper pipes. In AIT heat exchangers, however, the fins must be bonded to inner walls of the tube by a process such as soldering. Due to the fact that there is no practical way to form such a joint between aluminum fins and copper tubes, conventional AIT heat exchangers commonly utilize copper fins. As such, the size advantage of the AIT construction as compared to the WIT construction does not necessarily translate to lower cost, as the material of the WIT is predominantly aluminum, whereas conventional AIT exchangers use copper exclusively. There is thus a need for the unique and inventive heat exchange apparatuses, systems and methods disclosed herein.

SUMMARY

An exemplary fin-tube includes an outer tube, an inner tube disposed within the outer tube, and a plurality of fins extending from an outer surface of the inner tube to an inner surface of the outer tube. The outer tube includes an inner portion and an outer portion. In one exemplary embodiment the inner portion, the inner tube, and the fins can be formed at least primarily of aluminum. The outer portion can be formed at least primarily of copper. Further embodiments, forms, features, aspects, benefits, and advantages of the present application shall become apparent from the description and figures provided herewith.

DETAILED DESCRIPTION OF ILLUSTRATIVE EMBODIMENTS

Figure 1:
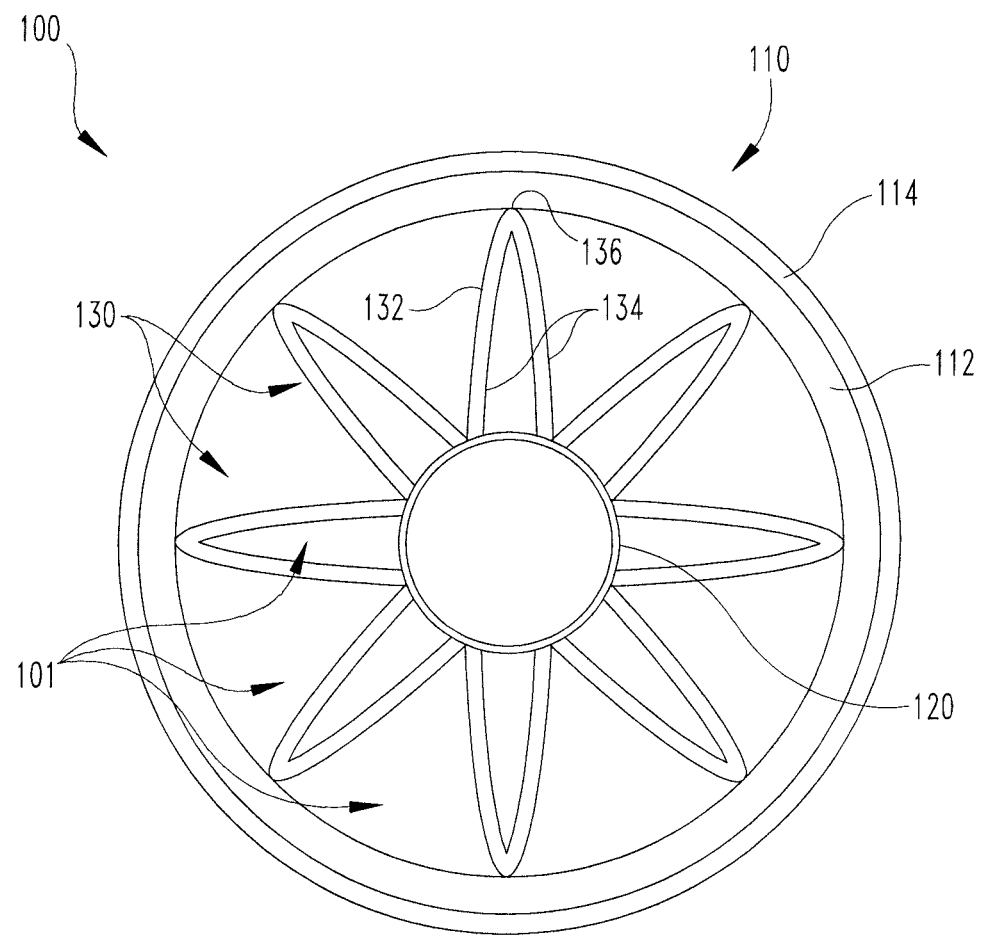
FIG. 1 is a cross-sectional illustration of a heat exchange fin-tube according to an embodiment of the invention.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

With reference to FIG. 1, an exemplary heat exchange fin-tube 100 includes an outer tube 110, an inner tube 120 disposed within the outer tube 110, and a plurality of fins 130 connecting the outer tube 110 to the inner tube 120. A plurality of flow paths 101 are defined by the outer tube 110, the inner tube 120, and the fins 130.

The outer tube 110 comprises an inner or base layer 112 and an outer layer 114 surrounding the base layer 112. The base layer 112 may be formed of aluminum or an aluminum alloy, and the outer layer 114 may comprise a cladding. In the illustrated embodiment, the base layer 112 is formed of a 3003 aluminum alloy, which comprises 1 to 1.5 percent manganese, up to about 0.6 percent silicon, up to about 0.2 percent copper, about 0.7 percent iron, and from about 0.15 to about 0.35 percent zinc. In other embodiments, other aluminum alloys may be utilized, such as, for example, another 3000 series aluminum alloy. In further embodiments, the base layer may be formed nominally pure aluminum. The illustrated cladding 114 is formed of nominally-pure copper; in other embodiments, the cladding 114 may comprise a copper alloy. In yet another embodiment, the base layer 112 may be formed from thermal conducive material other than 112 aluminum and the cladding or outer layer 114 may be formed from thermal conductive material other than copper.

The aluminum base layer 112 and copper cladding 114 are metallurgically bonded by a cladding process such as tube drawing, which allows the clad outer tube 110 to withstand the thermal shock of brazing without separation of the layers 112, 114. The thicknesses of the base layer 112 and the cladding 114 may be tailored to the application to balance corrosion resistance and material cost.

The inner tube 120 is substantially coaxial with the outer tube 110, and provides structural support to the fin-tube 100. In the illustrated form, the inner tube 120 is hollow. In other embodiments, however, the inner tube 120 may not necessarily be hollow.

The fins 130 extend radially outward from an outer surface of the inner tube 120 to an inner surface of the outer tube inner layer 112. The fins 130 may be joined to the base layer 112 and the inner tube 120 by brazing, and may be coated with a suitable brazing material 132 to facilitate such joining. While other forms are contemplated, in the illustrated embodiment, each of the fins 130 is bent to form a pair of legs 134 and a vertex 136. The ends of the legs 134 are in contact with the outer surface of the inner tube 120, and the vertex 136 is in contact with the inner surface of the outer tube inner layer 112. In the illustrated form, each of the fins 130 extends through the outer tube 110 substantially parallel to the longitudinal axis of the fin-tube 100, defining substantially straight flow paths 101. In other embodiments, the fins 130 may be twisted about the inner tube 120, such that flow paths 101 are helical.

In the illustrated embodiment, the inner tube 120 and fins 130 are formed of the same material as the outer tube inner layer 112, in order to facilitate the brazing process. It is also contemplated that the materials which form the outer tube inner layer 112, inner tube 120, and fins 130 may be similar to one another, or may be different. For example, one of the elements may comprise a first aluminum alloy, while another of the elements may comprise a second aluminum alloy or nominally pure aluminum. Materials comprising nonaluminum construction are also contemplated herein.

A method of forming the fin-tubes 100 may include forming the outer tube 110 using a tube drawing process to metallurgically bond the inner layer 112 with the outer layer 114. The method may further comprise coating the fins 130 with a brazing material 132, and positioning the fins 130 and the inner tube 120 within the outer tube 110 such that each of the fins 130 contacts an inner surface of the outer tube 110 and an outer surface of the inner tube 120. The method may further include melting and resolidifying the brazing material 132, thereby coupling the fins 130 to the inner and outer tubes 110, 120 and forming the fin-tube 100.

Figure 2:
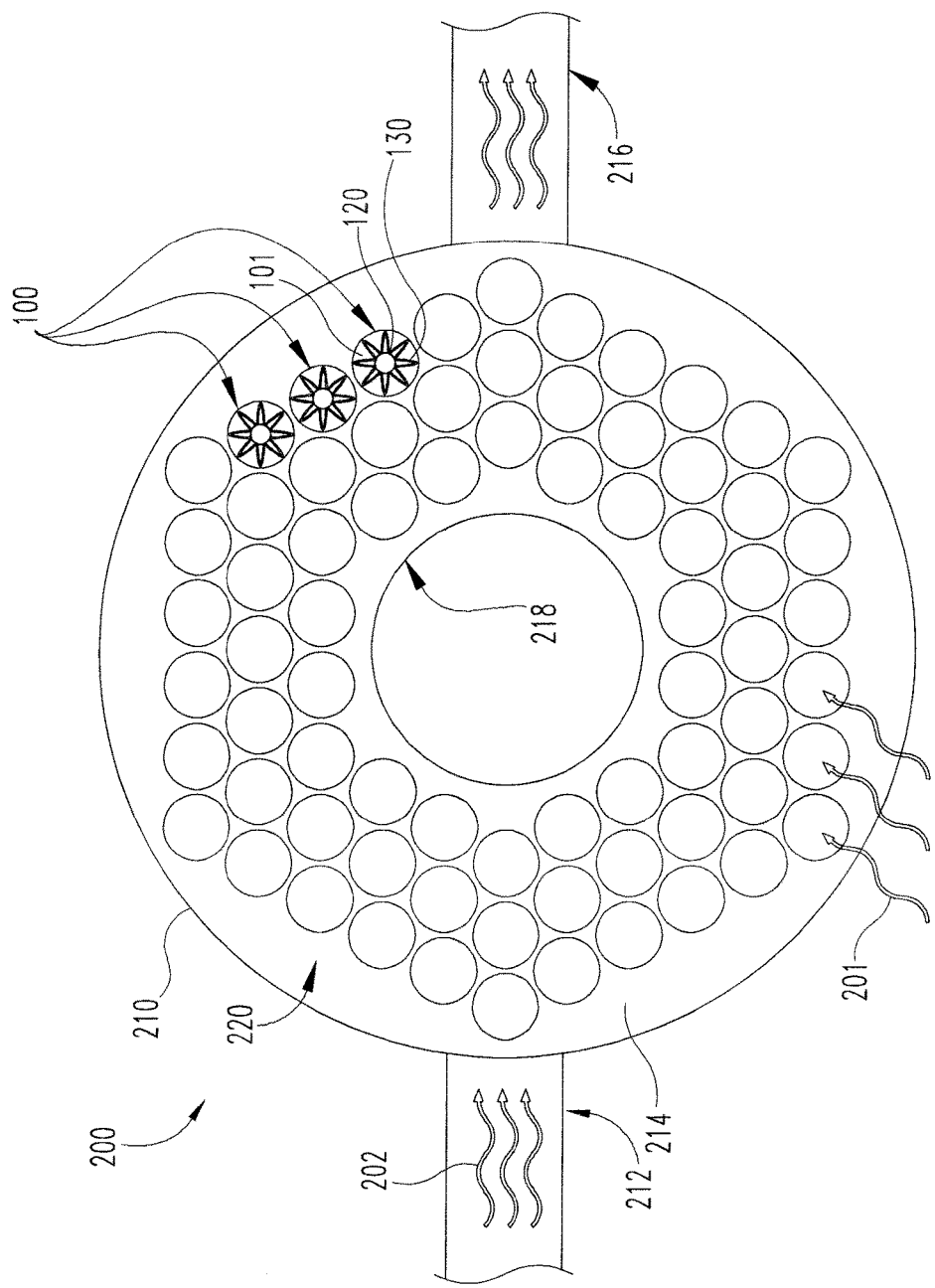
FIG. 2 is an illustration of an axial cross-section of a heat exchanger.

With additional reference to FIG. 2, an exemplary heat exchanger 200 includes a housing 210 and a tube array 220 disposed within the housing 210. The housing 210 includes a coolant inlet 212, an internal flow path 214, and a coolant outlet 216. In the illustrated form, the housing 210 also includes a central pipe 218, which provides structural support for the tube array 220. It is also contemplated that the central pipe 218 may be omitted, and that the tube array 220 may substantially fill the housing 210.

The tube array 220 includes a plurality of the fin-tubes 100 arranged in such a manner that a coolant can flow through the array 220 between the fin-tubes 100. In the interest of clarity, the inner tube 120 and fins 130 are illustrated only in the indicated fin-tubes 100; it is nonetheless to be appreciated that the inner tube 120 and the fins 130 may be present in some or each of the fin-tubes 100. Furthermore, while the illustrated array 220 is substantially hexagonal, it is also contemplated that the fin-tubes 100 may be arranged in another manner.

During operation of the heat exchanger 200, a hot gas 201 such as compressed air flows through the flow paths 101 in a longitudinal direction, and a coolant 202 flows through the tube array 220 in a transverse direction. For example, the coolant 202 may be provided to the coolant inlet 212, flow through the tube array 220 via the internal flow path 214, and exit at the coolant outlet 216. As the coolant 202 travels around and through the array 220, the gas 201 flowing through the fin-tubes 100 rejects heat to the coolant 202, thereby cooling the gas 201.

Figure 3:
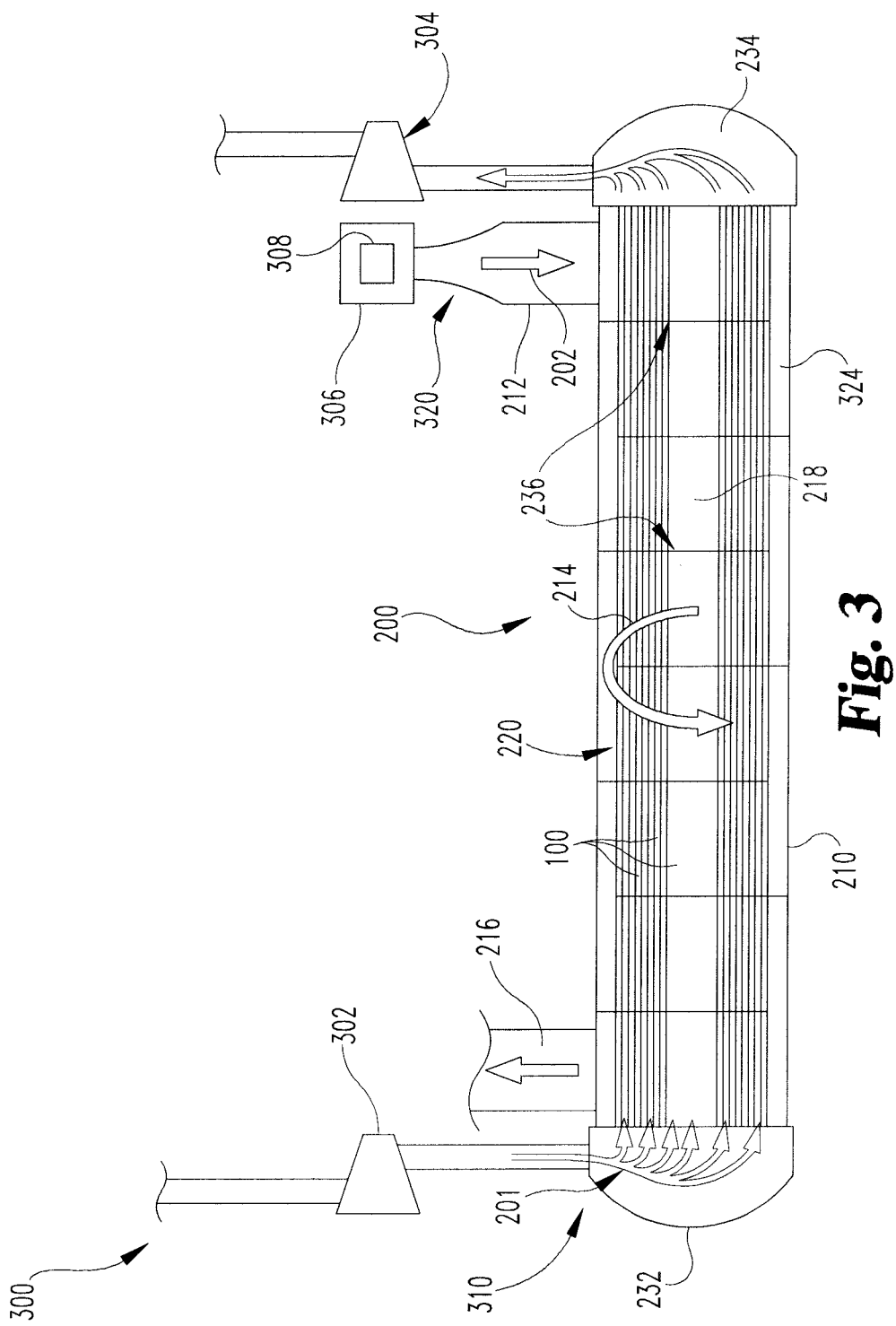
FIG. 3 is a schematic illustration of a compressor system including a heat exchanger.

With additional reference to FIG. 3, an illustrative multistage compressor system 300 includes a first compressor 302, a second compressor 304, a coolant source 306, and may further include a pump 308. The heat exchanger 200 fluidly couples the compressors 302, 304, and acts as an intercooler. In addition to the features described above with reference to FIG. 2, the heat exchanger 200 further includes an inlet header 232 which fluidly couples the first compressor 302 to the tube array 220, and an outlet header 234 which fluidly couples the array 220 to the second compressor 304. The heat exchanger 200 may further include a plurality of baffles 236 to make the internal flow path 214 more tortuous, thereby increasing the heat transfer capability of the heat exchanger 200.

The system 300 further includes a gas flow path 310 through which the gas 201 flows, and a coolant flow path 320 through which the coolant 202 flows. In the illustrated embodiment, the coolant 202 is water; it is also contemplated that the coolant may be a refrigerant, and that the system 300 may further include a vapor-compression circuit (not illustrated), and the heat exchanger 200 may serve as the condenser for such a vapor-compression circuit. The gas flow path 310 and the coolant flow path 320 are in thermal communication with one another, but are fluidly isolated from one another to prevent mixing of the gas 201 and the coolant 202.

The gas flow path 310 fluidly couples the first compressor 302 and the second compressor 304, and is formed by the inlet header 232, the fin-tubes 100 of the tube array 220, and the outlet header 234. The coolant flow path 320 is fluidly coupled to the coolant source 306, and is formed by the coolant inlet 212, the plurality of baffles 236 which define the internal flow path 214, and the coolant outlet 216. The system 300 may further include an after-cooling heat exchanger (not illustrated), and/or additional compressors (not illustrated). The system 300 may also include additional intercooling heat exchangers 200, for example in embodiments which include more than two compression stages.

During operation of the system 300, a gas is compressed by the first compressor 302, and hot compressed gas 201 is discharged to the gas flow path 310. As indicated by the diverging flow arrow, when the gas 201 enters the heat exchanger 200, the inlet header 232 diverts the gas 201 into the plurality of fin-tubes 100 which form the tube array 220. The gas 201 flows through the flow paths 101 of the fin tubes 100 to the outlet header 234, which directs the gas 201 to the second compressor 304, where the gas 201 is further compressed. At the same time, the water 202 is pumped from the coolant source 306 (for example by the pump 308) to the coolant flow path 320, where the coolant flows through the heat exchanger 200 along the internal flow path 214 to the coolant outlet 216.

As the high-temperature compressed gas 201 and the lower-temperature water 202 flow through the heat exchanger 200, the gas 201 rejects heat to the water 202. The gas 201 flows from the fin-tubes 100 into the outlet header 234, and the water 202 exits the heat exchanger 200 via the coolant outlet 216. After exiting the heat exchanger 200, the water 202 may be discharged to the environment, or may be reused, for example as a coolant for a second intercooler (not illustrated).

As the water 202 flows through the tube array 220, it comes into contact with the outer surface of the fin-tubes 100. Because the aluminum portions of the fin-tubes 100 are isolated from the water 202 by the copper outer layer 114, however, the fin-tubes 100 will not be subject to galvanic corrosion. Additionally, the aluminum inner layer 112 allows for aluminum fins 130 to be joined using a metallurgical bonding technique such as brazing, in order to facilitate proper heat transfer. As such, aluminum can be used for the fins 130, as opposed to the more expensive copper which would otherwise be required. Because heat exchangers are among the most expensive items in a compressor system such as the illustrated system 300, the inventive fin-tubes 100 disclosed herein can provide a significant cost savings for the manufacturer.

In one aspect, the present disclosure includes an apparatus comprising: a first tube including an inner portion formed at least primarily of aluminum and an outer portion formed at least primarily of copper; a second tube formed at least primarily of aluminum and disposed within the first tube; a plurality of fins formed at least primarily of aluminum and connecting the first tube the second tube.

In refining aspects, the present disclosure includes an apparatus, wherein the outer portion is formed essentially of copper; wherein the inner portion is formed essentially of aluminum; wherein the inner portion, the second tube, and the plurality of fins are formed from an aluminum alloy; wherein the aluminum alloy is a 3003 aluminum alloy; wherein each of the plurality of fins comprises two legs connected at a vertex, wherein the vertex is bonded to the first tube, and ends of the legs are bonded to the second tube.

In another aspect, the present disclosure includes a system comprising: a housing including a coolant inlet, a coolant outlet, and an inner flow path fluidly coupling the coolant inlet and the coolant outlet; a fin-tube array including a plurality of fin-tubes positioned in the inner flow path; an inlet header fluidly coupled to a first end of the fin-tube array; and an outlet header fluidly coupled to a second end of the fin-tube array; wherein each of the fin-tubes comprises: an outer tube including a base layer and an outer layer circumferentially surrounding the base layer, wherein the outer layer is metallurgically bonded to the base layer; an inner tube disposed within the outer tube; and a plurality of fins extending radially outward from an outer surface of the inner tube to an inner surface of the outer tube; wherein the base layer, the inner tube, and the fins are formed from a first material, and the outer layer is formed from a second material; and wherein the fin-tube array is in thermal communication with the inner flow path.

In refining aspects, the disclosure includes a system, wherein the first material includes aluminum and the second material includes copper; further comprising a first compressor including a discharge port fluidly coupled to the inlet header, and a second compressor including an intake port fluidly coupled to the outlet header; further comprising a pump configured to pump a coolant to the coolant inlet; wherein the fin-tube array comprises a hexagonal array of the fin-tubes; wherein the base layer, the inner tube, and the fins are formed of an aluminum alloy; wherein the outer layer is formed essentially of copper.

In another aspect, the present disclosure includes a method, comprising: forming, with a tube drawing process, a first tube including an inner layer and an outer layer, wherein the inner layer comprises aluminum and the outer layer comprises copper; coating a plurality of fins with a brazing material, wherein the fins comprise aluminum; positioning the plurality of fins and a second tube within the first tube such that each of the plurality of fins contacts an inner surface of the first tube and an outer surface of the second tube, wherein the second tube comprises aluminum; and melting and resolidifying the brazing material, thereby coupling the plurality of fins to the first and second tubes and forming a fin-tube.

In refining aspects, the present disclosure includes a method, further comprising positioning a plurality of the fin-tubes within a housing including a coolant flow path; further comprising: compressing, with a compressor, a gas; discharging the gas from the compressor to the plurality of fin tubes; flowing a coolant through the coolant flow path and into contact with the plurality of fin-tubes; and accepting, with the coolant, heat rejected by the gas through the plurality of fin-tubes; further comprising: flowing the gas from the plurality of fin-tubes to a second compressor; and compressing, with the second compressor, the gas; wherein the coolant is water.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. An apparatus comprising:
    an air-liquid heat exchanger having a first internal flow path configured to convey a liquid coolant and a second internal flow path configured to convey a gas;
    a first tube including an inner portion formed at least primarily of aluminum and an outer portion defined by a solid cladding which is formed at least primarily of copper, the first tube structured to convey the gas flowing in the second internal flowpath and the first tube positioned within the first internal flow path, the solid cladding structured to isolate the inner portion of the first tube from the liquid coolant flowing in the first internal flow path;
    a second tube formed at least primarily of aluminum and disposed within the first tube;
    a plurality of fins formed at least primarily of aluminum and connecting the first tube to the second tube, wherein the plurality of fins each include a leg that extends from the first tube to the second tube, wherein the legs each include a first lateral side that extends in a direction of the gas flowing in the second internal flow path and a second lateral side that extends in a direction of the gas flowing in the second internal flow path, and wherein each of the legs lack a through aperture such that the first lateral side of the leg is not in fluid communication with the second lateral side.

2. The apparatus of claim 1, wherein the outer portion is formed of copper.

3. The apparatus of claim 1, wherein the inner portion is formed of aluminum.

4. The apparatus of claim 1, wherein the inner portion, the second tube, and the plurality of fins are formed from an aluminum alloy.

5. The apparatus of claim 4, wherein the aluminum alloy is a 3003 aluminum alloy.

6. The apparatus of claim 1, wherein each of the plurality of fins comprises two legs connected at a vertex, wherein the vertex is bonded to the first tube, and ends of the legs are bonded to the second tube.

7. A system comprising:
    a housing including a coolant inlet, a coolant outlet, and an inner flow path fluidly coupling the coolant inlet and the coolant outlet, wherein the inner flow path is structured to convey a liquid coolant;

a fin-tube array including a plurality of fin-tubes positioned in the inner flow path such that the fin-tube array is within the inner flow path;

an inlet header fluidly coupled to a first end of the fin-tube array; and an outlet header fluidly coupled to a second end of the fin-tube array;

wherein each of the fin-tubes comprises:

an outer tube including a base layer and an outer cladding layer circumferentially surrounding the base layer, wherein the outer cladding layer is metallurgically bonded to the base layer and in which the outer cladding layer isolates the base layer from the liquid coolant conveyed within the inner flow path to discourage corrosion of the base layer;

an inner tube disposed within the outer tube, wherein the inner tube includes an interior passage structured to convey a compressed gas; and a plurality of fins extending radially outward from an outer surface of the inner tube to an inner surface of the outer tube, wherein the plurality of fins each include a leg that extends between the inner tube and the outer tube, wherein the legs each include a first lateral side that extends in a direction of the gas flowing in the inner flow path and a second lateral side that extends in a direction of the gas flowing in the inner flow path, and wherein each of the legs lack a fluid passage such that each leg prohibits fluid from being conveyed through the leg from the first lateral side to the second lateral side;

wherein the base layer, the inner tube, and the fins are formed from a first material, and the outer cladding layer is formed from a second material; and wherein the fin-tube array is in thermal communication with the inner flow path.

8. The system of claim 7, wherein the first material includes aluminum and the second material includes copper.

9. The system of claim 7, further comprising a first compressor including a discharge port fluidly coupled to the inlet header, and a second compressor including an intake port fluidly coupled to the outlet header.

10. The system of claim 7, further comprising a pump configured to pump the liquid coolant to the coolant inlet.

11. The system of claim 7, wherein the fin-tube array comprises a hexagonal array of the fin-tubes.

12. The system of claim 7, wherein the base layer, the inner tube, and the fins are formed of an aluminum alloy.

13. The system of claim 7, wherein the outer cladding layer is formed essentially of copper.

* * * * *